(12) United States Patent
Saito et al.

(10) Patent No.: US 6,743,529 B2
(45) Date of Patent: Jun. 1, 2004

(54) PROCESS FOR PRODUCING GLASS SUBSTRATE FOR MAGNETIC RECORDING MEDIUM AND GLASS SUBSTRATE FOR MAGNETIC RECORDING MEDIUM OBTAINED BY THE SAME

(75) Inventors: Yasuhiro Saito, Osaka (JP); Hiroshi Ikeda, Osaka (JP); Junji Kurachi, Osaka (JP); Kazuishi Mitani, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/015,683

(22) Filed: Dec. 17, 2001

(65) Prior Publication Data

US 2002/0127432 A1 Sep. 12, 2002

(30) Foreign Application Priority Data

Dec. 18, 2000 (JP) .................... P.2000-383216
Nov. 29, 2001 (JP) .................... P.2001-363504

(51) Int. Cl.$^7$ ................................. G11B 5/66
(52) U.S. Cl. .................... 428/694 SG; 428/694 ST; 428/426; 428/432; 428/433; 428/900; 427/128; 427/129; 427/130; 427/131; 427/132
(58) Field of Search .................... 428/694 SG, 694 ST, 428/426, 432, 433, 900; 427/128–132

(56) References Cited

U.S. PATENT DOCUMENTS

| 6,248,395 B1 | 6/2001 | Homola et al. |
| 6,383,404 B1 * | 5/2002 | Sakai et al. .................... 216/97 |
| 6,395,634 B1 * | 5/2002 | Miyamoto .................... 438/691 |
| 6,548,139 B2 * | 4/2003 | Sakai et al. .................... 428/65.3 |

FOREIGN PATENT DOCUMENTS

| JP | 63-160010 A | 7/1988 |
| JP | 2000-132829 | 5/2000 |

* cited by examiner

Primary Examiner—Leszek B Kiliman
(74) Attorney, Agent, or Firm—Sughrue Mion, PLLC

(57) ABSTRACT

A process for producing a glass substrate for a magnetic recording medium by forming a surface roughness in a main surface of a glass plate that has been formed into a disk shape, includes: imparting a processing mark having a permanent strain to the main surface of the glass plate in a circumferential direction thereof; and chemically etching the whole main surface of the glass plate, so as to form the surface roughness.

9 Claims, 2 Drawing Sheets

GLASS PLATE SURFACE

PORTION HAVING PERMANENT STRAIN

ETCHING AMOUNT

PROCESS FOR PRODUCING GLASS SUBSTRATE FOR MAGNETIC RECORDING MEDIUM AND GLASS SUBSTRATE FOR MAGNETIC RECORDING MEDIUM OBTAINED BY THE SAME

BACKGROUND OF THE INVENTION

1. Field of the Invention

The present invention relates to a glass substrate for magnetic recording media, a process for producing the same, and a magnetic recording medium obtained with the substrate. More particularly, the invention relates to a glass substrate capable of giving a magnetic recording medium which is effective in attaining a reduced magnetic-head flying height and is so reliable that the information magnetically recorded therein is not lost or attenuated even upon long-term use at a high rotational speed. The invention further relates to a process for producing this substrate.

2. Description of the Related Art

With remarkable progress in the handling of digital information in recent years, various devices for storing such information therein have been developed. Improvements in these devices are ever-progressing, and the information recording capacity and the speed of recording/reproducing are increasing at an annual rate of tens of percents. In particular, the information recording devices which are currently used most widely are magnetic disks, and they are being improved at a higher rate than the other devices.

Under these circumstances, magnetic disks are required to be magnetic recording media capable of recording information at a higher density. For satisfying this requirement, the substrates for magnetic recording media also have come to be required to have high flatness, high smoothness, and rigidity. Because of this, glass substrates, which can be easily ground and polished, are recently coming to be employed as a substitute for the aluminum substrates, which have conventionally been used mainly.

The aluminum substrates for use in this application usually have a multilayer constitution comprising aluminum substrate/nickel layer/phosphorus layer. In the surface of the phosphorus layer, an anisotropic texture comprising concentric marks (an oriented surface roughness) is formed by a mechanical means such as grinding. A magnetic film formed on such an anisotropic texture has C-axis orientation in a circumferential direction, which is caused by an anisotropic film stress, to constitute a so-called oriented medium. This kind of substrate is disclosed in JP-A-6-231442. (The term "JP-A" as used herein means an "unexamined published Japanese patent application".)

On the other hand, the magnetic recording media employing a glass substrate which have been practically used are ones having an isotropic surface roughness having no anisotropic texture (the term "isotropic surface roughness" is herein used also for magnetic recording media having a surface roughness formed at random). However, the recording media having an isotropic surface roughness have been found to have the following drawback. When such a recording medium is one produced so as to be capable of high-density recording, there are cases where signals once written therein are lost or rapidly attenuated, making it impossible to conduct highly reliable magnetic recording.

In JP-A-63-160010 is disclosed a glass substrate for magnetic recording media obtained by forming a texture in a circumferential direction in a smooth surface of a glass substrate by a mechanical method or chemical etching. However, the magnetic recording medium employing the substrate obtained by this process has a problem that it cannot have a fine surface roughness and, hence, it is difficult to glide a magnetic head thereover at a small height (to scan the magnetic head with a low glide height) so as to enable high-density recording. It has hence been proposed recently to use a mixture of cerium oxide, which has the high ability to abrade glasses, and a diamonds lurry (see JP-A-2000-101656). Other techniques which have been proposed include to use a slurry containing a solution having hydroxyl groups, such as an aqueous potassium hydroxide solution or aqueous sodium hydroxide solution, and thereby impart a chemical action to a mechanical processing force (see JP-A-2000-301441 and JP-A-2001-9694).

The technique of mechanically imparting a surface roughness (mechanical texture) to the multilayered film composed of a nickel layer and a phosphorus layer has a drawback that the processing for forming the roughness tends to generate foreign particles or dust particles and this not only results in a reduced yield in the production of magnetic recording media but also leads to an increased cost. It has hence been proposed in the reference cited above to use a substrate obtained by directly forming an anisotropic texture on a surface of a glass substrate. However, this technique has a drawback that since glass plates have a higher surface hardness than aluminum substrates, it is difficult to use the above-described technique of the related art to form a fine texture. Furthermore, the technique of using-cerium oxide, which has the high ability to abrade glasses, and the technique of using a slurry containing a solution having hydroxyl groups have the following drawback. Although these techniques are effective in forming a fine texture, the shape of the texture readily changes upon cleaning with a chemical due to the high fineness thereof. Because of this, there have been severe restrictions on the use of chemicals in removing diamond or other abrasive grains caught in grooves of the texture. In particular, acid aqueous solutions, which are highly effective in cleaning multicomponent glasses, cannot be used because they considerably change the texture shape. Due to such restrictions, substrates obtained through the texturing treatment often have residual abrasive grains which were contained in the slurry used.

SUMMARY OF THE INVENTION

An object of the invention is to eliminate the problems described above, and, more specifically, is to provide a glass substrate giving a magnetic recording medium in which reading/writing operations can be conducted while gliding the magnetic head at a smaller height, and to provide a process for producing the glass substrate.

According to a first aspect of the invention so as to solve the above problems, a process for producing a glass substrate for magnetic recording media is provided which comprises forming a surface roughness in the main surface of a glass plate which has been formed into a disk shape, wherein the surface roughness is formed by imparting processing marks having a permanent strain to the main surface of the glass plate in a circumferential direction thereof and then chemically etching the whole main surface of the glass plate.

The term "processing marks" as used herein means those surface and near-surface parts in a glass which have a residual permanent strain formed by a mechanical stress without or with a physical change in shape. Although it is usually difficult to directly subject a glass substrate, which has a high hardness, to texturing (surface processing) by a mechanical means, a permanent strain can be formed therein relatively easily.

In one preferred embodiment of the process of the invention for producing a glass substrate for magnetic recording media, the surface roughness is formed based on a difference in the depth of chemical etching between the areas having the processing marks and the areas not having the processing marks. This method of surface roughness formation according to the invention is based on the fact that the glass in the areas having a permanent strain differs in resistance to acids or alkalis from that in the areas not having a permanent strain. Specifically, the surface roughness formation is based on the fact that the areas having a permanent strain have higher acid resistance (lower susceptibility to chemical etching with an acid solution) than the areas not having a permanent strain, or is based on the fact that the areas having a permanent strain have higher alkali resistance (lower susceptibility to chemical etching with an alkaline solution) than the areas not having a permanent strain.

The fact described above was experimentally found by the present inventor. Based on this fact, processing marks having a permanent strain in a circumferential direction of the glass substrate are imparted to a surface of a glass and to near-surface parts thereof, and the whole glass surface is then chemically etched, for example, with a solution of an acid or alkali. In this etching, the areas bearing the processing marks having a permanent strain have a lower etching rate in the glass depth direction than the areas having no or a smaller amount of permanent strain. Because of this, the areas having a permanent strain leave protrusions after the etching. Thus, a surface roughness (texture) which is constituted of the oriented protrusions in a circumferential direction of the glass substrate and is useful in magnetic recording media can be formed.

The impartation of processing marks to a disk-form glass plate in a circumferential direction thereof can be accomplished by a method in which a substrate or film having fixed thereto fine particles of a material harder than the glass is pressed against the surface of the glass plate kept being rotated. Alternatively, the impartation may be accomplished by a method in which a substrate or film is kept being pressed against the glass plate kept being rotated, and hard fine particles are supplied to between the glass plate and the substrate or film.

In another preferred embodiment of the process of the invention for producing a glass substrate for magnetic recording media, the processing marks are formed by rubbing the main surface of the glass plate with a processing tape while supplying a processing fluid comprising a slurry to the main surface of the glass plate.

A suitable method for forming processing marks in a circumferential direction of the main surface of the glass plate is to rub the surface of the glass plate in a circumferential direction with a processing tape and a processing fluid comprising a slurry. For example, it is preferred to use a method in which a processing tape is pressed against the glass plate surface while supplying the processing fluid to the glass surface to thereby press fine particles suspended in the processing fluid against the glass plate surface. By this method, the formation of processing marks in the circumferential direction can be satisfactorily controlled.

The material of the processing tape to be used is not particularly limited, and known processing tapes can be used. Examples thereof include resin tapes made of a polyester, cellulose, nylon, or the like. The slurry may be one comprising a liquid, e.g., water, and an abrasive material suspended therein. A suitable kind of abrasive material is selected according to the desired texture to be formed. Although an abrasive material can be selected according to the desired texture shape, smaller abrasive materials usually give finer textures.

In still another preferred embodiment of the process of the invention for producing a glass substrate for magnetic recording media, the chemical etching is conducted with an etchant containing either hydrofluoric acid or hydrosilicofluoric acid or containing a mixture of these acids.

For the chemical etching after the formation of processing marks, it is preferred to use an etchant with which the shape of the texture can be suitably controlled. An example of such an etchant is one containing hydrofluoric acid or hydrosilicofluoric acid. This etchant is preferred in that a sufficiently large difference in etching rate between the areas having a permanent strain and areas not having a permanent strain can be obtained and that the amount of glass to be removed by etching can be easily controlled. An alkaline solution also can be used as an etchant in the invention.

In still another preferred embodiment of the process of the invention for producing a glass substrate for magnetic recording media, the glass substrate which has undergone the roughness-forming treatment is subjected to a chemical strengthening treatment in which part of the ions contained in the glass substrate are replaced with ions contained in a molten salt which have a larger ionic radius than those ions.

After the chemical strengthening treatment, cleaning may be conducted as a final cleaning step for satisfying the cleanliness required of glass substrates for magnetic recording media. This step is conducted in a highly controlled clean room. In contrast, the roughening treatment described above cannot be conducted in a clean room due to the necessity of using a slurry. Consequently, when a roughening treatment is to be conducted after the chemical strengthening treatment, the process is complicated, for example, because it is necessary to install a separate booth in the clean room.

According to this embodiment, the production process is simple and the production cost can be reduced because a chemical strengthening treatment is conducted after the roughening treatment.

In still another preferred embodiment of the process of the invention for producing a glass substrate for magnetic recording media, the glass substrate which has undergone the chemical strengthening treatment is subjected to cleaning with an acid aqueous solution and with an alkaline aqueous solution successively.

The acid cleaning and alkali cleaning, which are conducted after the chemical strengthening treatment, are intended to regulate the shape of the texture (roughness) which has been altered by the chemical strengthening treatment. The mechanism of this cleaning is as follows. There are cases where the processing marks formed in a circumferential direction of the glass substrate relax and expand due to heat during the chemical strengthening and the ridges of the resultant texture have an excessively large height. On the other hand, when this glass is cleaned successively with an acid and an alkali, part of the glass components selectively dissolves in the acid to leave a framework layer containing silica as the main component.

This framework layer is porous and, hence, undergoes mild etching with the alkali. Thus, by conducting acid cleaning and alkali cleaning after the chemical strengthening treatment, the shape of the texture ridges which have been made excessively high can be regulated. Since relaxation of the permanent strain has progressed after the chemical strengthening treatment, a large difference in etching rate such as that described above does not arise and, hence, the cleaning does not result in further texture growth. Furthermore, since the permanent strain has not relaxed completely, the texture does not disappear through the etching, unlike textures formed by a mechanical method alone. Because of these, the chemical strengthening treatment is not accompanied by a considerable change in shape. The cleaning with an acid and an alkali functions also to remove impurities such as the strengthening salt and iron which adhered during the step of chemical strengthening treatment.

In still another preferred embodiment of the process of the invention for producing a glass substrate for magnetic recording media, a glass substrate for magnetic recording media produced by the process of the invention, wherein the main surface thereof has a surface roughness of from 0.5 to 1.0 nm in terms of Ra value as determined with an AEM, and the value of Rmax obtained by subtracting the minimum height of the roughness from the maximum height thereof is 3.0 nm or higher.

Values of Ra lower than 0.5 nm are undesirable in that the magnetic recording medium has an increased area of contact with a magnetic head, so that the magnetic head is apt to stick to the recording medium, resulting in a heightened probability of rotation troubles. On the other hand, values of Ra exceeding 1.0 nm are undesirable in that the magnetic recording medium has too small an area of contact with a magnetic head, and that when abnormal projections which are only slightly too high are present, they may collide with a magnetic head and abrade, often resulting in head crushing or head corrosion. The value of Rmax is preferably 3.0 nm or higher from the standpoint of preventing a magnetic head from sticking to the surface of the magnetic recording medium.

In still another preferred embodiment of the glass substrate for magnetic recording media of the invention, the value of Rmax is 15 nm or lower. This is because values of Rmax exceeding 15 nm result in a further heightened probability of head crushing.

In still another preferred embodiment of the glass substrate for magnetic recording media of the invention, a glass substrate for a magnetic recording medium is produced by the process of the invention, wherein the main surface of the glass substrate has a surface roughness of 0.2 to 0.5 nm in terms of Ra value as determined with an AFM, and the value of Rmax obtained by subtracting the minimum height of the roughness from the maximum height thereof is 2.0 nm or higher. The value of Rmax is preferably not higher than 15 nm because values of Rmax exceeding 15 nm result in a further heightened probability of head crushing.

The substrate according to this aspect is applicable also to hard-disk drives of a type of recording employing a small head flying height, such as the ramp road type.

In another preferred embodiment of the glass substrate for magnetic recording media of the invention, the roughness formed in the main surface of the glass substrate is linearly arranged in a circumferential direction of the substrate so that the main surface has a radial-direction line density of 5,000 to 40,000 lines per mm as determined with an AFM.

In another preferred embodiment of the glass substrate for magnetic recording media of the invention, a magnetic recording medium comprises the glass substrate of the invention described above and a magnetic recording film including a magnetic film, so that the magnetic recording film covers the main surface of the glass substrate.

Since the magnetic recording medium of the invention has a magnetic recording film covering the glass substrate having a surface roughness in a circumferential direction, the magnetic film can have such magnetic anisotropy that the coercive force thereof in the circumferential directions is not lower than that in the radial directions.

Figure 1:
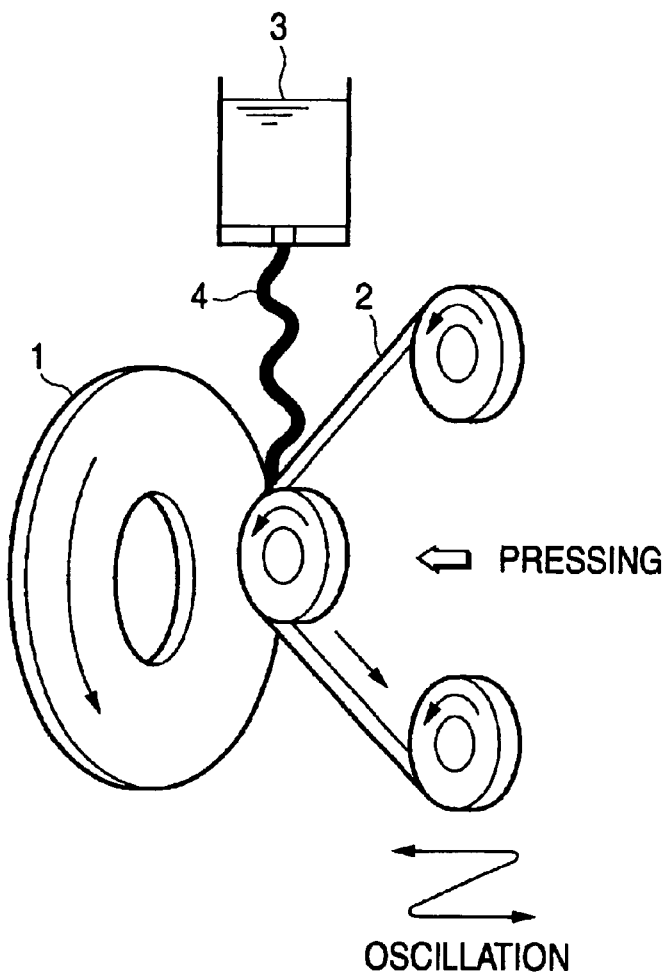
FIG. 1 is a view illustrating one embodiment of a method for imparting processing marks in a circumferential direction to a glass plate surface in the process of the invention.

The description of the reference numbers used in the drawings is as follows.

1: glass plate
2: processing tape
3: polishing slurry feed vessel
4: polishing fluid
10: processing mark

PREFERRED EMBODIMENT OF THE INVENTION

Modes for carrying out the invention and examples thereof will be explained below. However, the invention should not be construed as being limited to the following examples. Glass compositions usable in the invention are not particularly limited, and examples thereof include crystallized glasses such as: a soda-lime silica glass comprising silicon dioxide, alkali metal oxides, and alkaline earth metal oxides as main components; an aluminosilicate glass comprising silicon dioxide, aluminum oxide, and alkali metal oxides as main components; a borosilicate glass comprising silicon dioxide and boron oxide as main components; an $Li_2O$—$SiO_2$ glass comprising lithium oxide and silicon dioxide as main components; an $Li_2O$—$Al_2O_3$—$SiO_2$ glass comprising lithium oxide, silicon dioxide, and aluminum oxide as main components; and an RO—$Al_2O_3$—$SiO_2$ glass comprising alkaline earth metal oxides, aluminum oxide, and silicon dioxide as main components (provided that RO represents magnesium oxide MgO, calcium oxide CaO, strontium oxide SrO, barium oxide BaO, zinc oxide ZnO, nickel oxide NiO, manganese oxide MnO, etc.). Aluminum oxide, alkali metal oxides, and alkaline earth metal oxides, among various glass components, are ingredients which are apt to dissolve in acid aqueous solutions. Glasses containing these ingredients in appropriate amounts are preferred from the standpoint of forming the texture required of glass substrates for magnetic recording media, because the chemical etching thereof is relatively easy. Examples of such glass compositions include the following aluminosilicate glass (mol %).

$SiO_2$:55–70%
$Al_2O_3$:1–13%
$Li_2O$:5–20%
$Na_2O$:0–14%
$K_2O$:0–3%

MgO:0–8%
CaO:0–10%
SrO:0–6%
BaO:0–2%
$TiO_2$:0–8%
$ZrO_2$:0–4%

In the invention, prior to the formation of a surface roughness (texture), the glass plate is usually subjected to rough polishing (grinding) to regulate the thickness of the glass plate to a given size so as to secure flatness required of glass substrates for magnetic recording media. Thereafter, the ground surface is mirror-polished. Abrasive materials usable for the mirror polishing are not particularly limited, and examples thereof include cerium oxide, manganese oxide, and zirconia. Such abrasive materials are finely particulate. Although the sizes of the abrasive materials are not particularly limited, an abrasive material having a size of about from 0.01 to 3 $\mu$m is usually used in order to attain both flatness and a polishing rate. Methods for polishing also are not particularly limited. However, a double-side-polishing machine having an artificial suede pad attached to each of upper and lower platens can be advantageously used for precisely mirror-polishing both sides of the glass plate at low cost. By optimizing conditions including abrasive material size and polishing rate to thereby heighten the smoothness of the main surface of the glass plate beforehand, a finer texture having a small value of Ra can be formed through the texturing treatment.

After the glass plate which has been mirror-polished is washed, processing marks are formed in a circumferential direction of the glass plate. A suitable method for forming processing marks in the invention is to rub the substrate surface with a processing fluid comprising a slurry and a processing tape. One technique for rubbing a glass substrate surface with a processing tape is illustrated in FIG. 1. In this technique, a glass substrate which has been formed into a doughnut disk shape is kept being rotated at a constant speed, and a tape is pressed against the glass plate at a constant pressure to thereby form processing marks in the circumferential direction. Although the rotational speed of the glass plate is not particularly limited, it is usually regulated to about from 5 to 1,000 rpm. The pressure at which the processing tape is pressed also is not particularly limited. Use of lower pressing pressures gives finer textures, while higher pressing pressures enable high-speed processing. An appropriate pressing pressure may be suitably selected according to the desired texture shape. In general, pressing pressures of about from 20 to 500 g/cm$^2$ are preferred because such pressures enable efficient formation of processing marks. The processing tape is preferably caused to run at a speed of from 10 to 10,000 mm/sec.

The slurry to be used in the invention is not particularly limited in kind. For example, a dispersion of free abrasive grains, e.g., diamond crystals, cerium oxide, manganese oxide, zirconia, titania, or silicon dioxide, in a medium such as water can be used. The size of the abrasive material also is not particularly limited. In general, the finer the abrasive material, the more the texture can be controlled precisely. However, since use of too small abrasive grains results in inefficient formation of processing marks, it is usually preferred to use an abrasive material of about from 0.05 to 3 $\mu$m. A dispersant, lubricant, and antifungal agent can be added according to need to the slurry to be used. After processing marks are formed while supplying a slurry, the glass plate maybe further treated with the tape while supplying pure water or a commercial, neutral or alkaline detergent, in order to remove the residual slurry. Thereafter, the glass plate is preferably further cleansed by ultrasonic cleaning, shower cleaning, etc.

The glass plate in which processing marks have been formed in the circumferential direction by the method described above is etched by a chemical method. The etchant is not particularly limited in kind. However, an etchant containing hydrofluoric acid or hydrosilicofluoric acid or containing both is preferred in that a large difference in etching rate between the areas having the processing marks and the areas not having the marks can be obtained and that etching can be satisfactorily controlled.

The reasons why the areas having processing marks differ in etching rate from the areas not having processing marks are presumed to be as follows. The processing marks formed by a method according to the invention mostly have a physical shape and have a permanent compression strain due to the processing pressure. It is thought that the areas having such a compression strain are less susceptible to chemical etching (having a lower etching rate in the glass depth direction) than the areas not having the strain. Furthermore, this difference in etching rate is especially large when an acid etchant such as one containing hydrofluoric acid or hydrosilicofluoric acid is used. The reasons for this phenomenon have not been elucidated. It is, however, presumed that those constituent components of the glass which have poor acid resistance, such as alkali metal oxides and alkaline earth metal oxides, usually readily dissolve in acid solutions to accelerate etching, whereas the glass components located in the compressed areas are less susceptible to such dissolution.

Figure 3A:
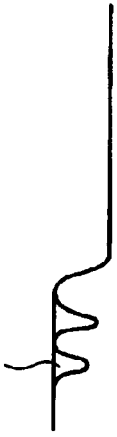
FIGS. 3A to 3D are views illustrating how the processing-mark areas formed in the invention, which have a permanent strain, are chemically etched.
Figure 3B:
Figure 3C:
Figure 3D:
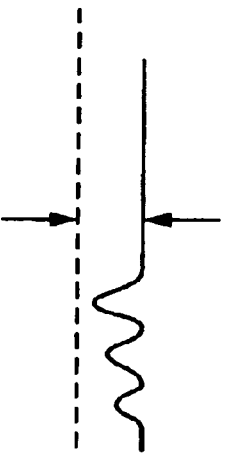

FIGS. 3A to 3D diagrammatically illustrate surface roughness formation steps which comprise initiating etching on the surface of a glass plate, forming a surface roughness by etching, and finally giving a glass substrate for magnetic recording media. FIG. 3A shows a glass plate having a mirror-polished surface. FIG. 3B is a diagrammatic view showing a section of the glass plate to which areas having a compression strain extending from the glass surface to inner parts have been imparted by rubbing the glass surface in a circumferential direction thereof with a processing tape while supplying a slurry of an abrasive material to the glass surface. Since these areas having a compression strain have been formed by pressing the processing tape against the surface of the glass plate which is kept being rotated, they are oriented in the circumferential direction. As shown in FIG. 3C illustrating an initial stage of etching, the amount of the glass removed by etching (etching depth) is small in those surface and near-surface areas of the glass which have a permanent compression strain. As the etching further proceeds, the difference in susceptibility to etching results in a larger difference in etching amount between the areas having a compression strain and the areas not having the strain, as shown in FIG. 3D. As a result, a glass surface having a surface roughness is obtained.

For the chemical etching of the glass plate in the invention, use can be made, for example, of a method in which the glass plate is immersed in an etchant and a method in which an etchant is brought into contact with the glass plate by showering, ejection, etc. In this etching operation, ultrasonic application or brushing may be conducted in order to simultaneously remove dust particles or fouling substances. The concentration and temperature of the etchant and the time period of etching are suitably determined. In general, the higher the etchant concentration and temperature, the higher the etching rate. Although high etching rates are advantageous in working efficiency, too high etching rates result in reduced control of the shape of surface roughness. The preferred ranges of the concentration of the etchant are usually from 0.001 to 0.5% by weight and from 0.01 to 1% by weight in cases of hydrofluoric acid and hydrosilicofluoric acid, respectively. A mixture of these may be used. The etchant temperature is preferably from room temperature to 70° C.

The glass plate which has undergone the etching is rinsed with pure water and then dried. Prior to the rinsing with pure water, the glass plate may be cleansed with a commercial, neutral or alkaline detergent. Methods for the rinsing also are not particularly limited, and examples thereof include immersion, immersion with ultrasonic application, showering, and ejection. Methods for the drying also are not particularly limited, and examples thereof include spin drying and drying with isopropyl alcohol.

A surface roughness (texture) is thus imparted to the glass plate in a circumferential direction thereof. Thereafter, this glass plate may be subjected to a chemical strengthening treatment for securing the necessary mechanical strength. The chemical strengthening treatment can be accomplished by immersing the glass plate in a molten salt. As the molten salt can be used a molten salt containing ions larger than the alkali ions contained in the glass. Examples thereof include known molten salts such as potassium nitrate, sodium nitrate, and mixtures thereof. The chemical strengthening treatment may be conducted before or after the formation of a surface roughness on the glass plate. For preventing the production process from becoming complicated, it is preferred to conduct the chemical strengthening treatment after the texturing treatment.

The substrate which has undergone the texturing treatment or the chemical strengthening treatment may be subjected to cleaning with an acid aqueous solution and an alkaline aqueous solution successively. In the cleaning with an acid aqueous solution, part of the components of the glass dissolves in the acid aqueous solution to leave a layer rich in silicon dioxide, which is the component constituting the framework of the glass. Because of this, the surface is easily etched by the subsequent cleaning with an alkaline aqueous solution. Consequently, the cleaning with a combination of an acid aqueous solution with an alkaline aqueous solution not only enables impurities, e.g., iron, tenaciously adherent to the glass surface to be easily removed by etching, but also functions to adequately control the amount of glass to be removed by etching. Due to this synergistic action, the abrasive material can be almost completely removed.

The kind of the acid aqueous solution is not particularly limited. Preferred examples thereof include ones which function to etch glasses, such as aqueous solutions of hydrofluoric acid and hydrosilicofluoric acid, and ones which accelerate selective etching of glass surfaces, such as aqueous solutions of strong acids, e.g., sulfuric acid, hydrochloric acid, nitric acid, sulfamic acids, and phosphoric acid. The alkaline aqueous solution also is not particularly limited, and use can be made of an aqueous solution of any alkaline substance soluble in water, such as potassium hydroxide, sodium hydroxide, ammonia, or trimethylammonium. An alkaline detergent as well as a surfactant and a chelating agent may be added in order to enhance the cleaning effect.

The concentrations of the acid and alkali are not particularly limited, and may be suitably selected in a range necessary for removing impurities including iron. In case where the amount of glass to be removed by etching is too large, there is a fear that edges of the glass substrate may be changed in shape. It is therefore preferred to regulate the etching amount to 3 nm or smaller. The time period of cleaning and the cleaning temperature also are not particularly limited, and such conditions are suitably determined. It is generally preferred to use a cleaning time of from 1 to 20 minutes and a cleaning temperature of 70° C. or lower from the standpoint of production cost. Specific methods for the cleaning with an acid and an alkali and methods for rinsing, drying, etc. are not particularly limited, and may be the same as for the etching.

The thus-obtained glass substrate for magnetic recording media is coated with a magnetic recording layer formed by providing at least an undercoat layer for controlling magnetic-layer crystallinity, a magnetic layer, and a protective layer, in this order. Thus, a magnetic recording medium is produced. The magnetic recording film may optionally have a multilayer constitution including a shielding layer interposed between the glass plate and the undercoat layer or including a buffer layer or shielding layer formed for each layer.

EXAMPLE 1

Figure 2:
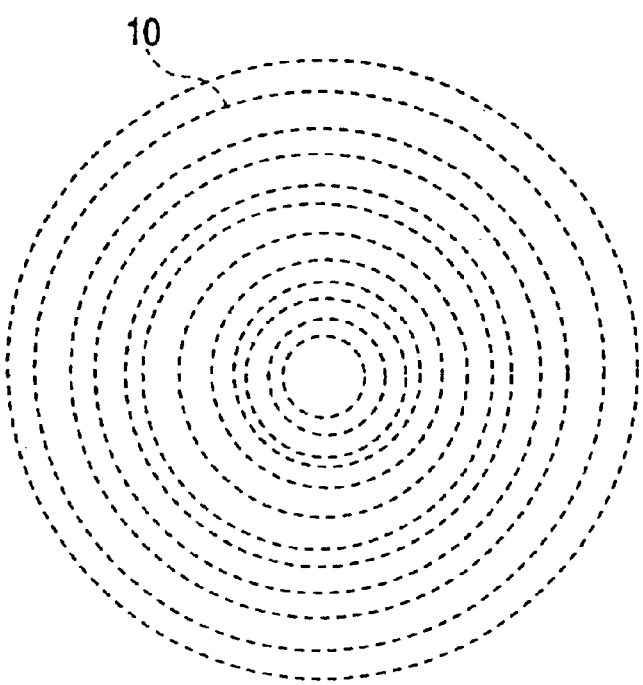
FIG. 2 is a view illustrating one embodiment of the oriented surface roughness (texture) formed in the glass substrate in a circumferential direction thereof for magnetic recording media of the invention.

The main surface of a doughnut-shape aluminosilicate glass plate (having a composition comprising 66.0% $SiO_2$, 11.0% $Al_2O_3$, 8.0% $Li_2O$, 9.1% $Na_2O$, 2.4% MgO, and 3.6% CaO) having a thickness of 0.6 mm, an outer diameter of 65 mm, and an inner diameter of 20 mm was mirror-polished with an abrasive material comprising cerium oxide. Thereafter, the glass plate was cleansed by a shower of pure water to remove the abrasive material adherent to the surface of the doughnut-shaped glass plate. The surface roughness of the glass plate thus mirror-polished was examined with an AFM and, as a result, the Ra was found to be 0.35 nm. Subsequently, processing marks were imparted to the glass plate by the tape polishing method illustrated in FIG. 1, while dropping onto the plate a slurry containing 0.03% by weight diamond. This processing was conducted under the conditions of a glass plate rotational speed of 850 rpm, a processing nylon tape pressing pressure of 1.3 kg/cm$^2$, a tape running speed of 10 mm/sec, and a processing time of 6 seconds. After the tape processing, the glass plate was cleansed by a shower of pure water to remove most of the abrasive material adherent to the glass plate. Subsequently, the glass plate was immersed for 5 minutes in 0.05% by weight hydrofluoric acid solution kept at 30° C. while applying 48 kHz ultrasonic thereto at 1 W/cm$^2$, and was then transferred to a pure-water bath and sufficiently rinsed. This glass plate was immersed in a commercial, weakly alkaline detergent at room temperature for 5 minutes and then rinsed by immersion in a pure-water bath; this operation was repeatedly conducted three times. Thereafter, the glass plate was dried in an isopropyl alcohol vapor for 1 minute. The Ra of the thus-obtained sample glass substrate for magnetic recording media was determined with an AFM (atomic force microscope) and, as a result, was found to be 1.2 nm. Furthermore, it was ascertained from an AFM examination that a concentric surface roughness 10 had been formed in the glass substrate surface as shown in FIG. 2.

EXAMPLE 2

A sample glass substrate for magnetic recording media was produced in the same manner as in Example 1, except that the etchant was replaced with 0.3% by weight hydrosilicofluoric acid solution. This glass substrate for magnetic recording media had a value of Ra, as determined with an AFM, of 1.3 nm. It was ascertained that almost the same concentric surface roughness as in Example 1 had been formed.

EXAMPLE 3

A glass substrate for magnetic recording media was produced in the same manner as in Example 2, except that the etchant was replaced with 10% by weight caustic soda solution and the temperature for immersion was changed to 70° C. It was ascertained from an AFM examination that the same concentric surface roughness as in the samples obtained in Examples 1 and 2 had been formed. This sample had an Ra of 0.5 nm, which was smaller than in Examples 1 and 2.

EXAMPLE 4

A sample glass substrate for magnetic recording media was obtained in the same manner as in Example 3, except that the time period of immersion in the etchant was changed to 20 minutes. As a result, a concentric surface roughness could be formed as in Examples 1 and 2. This sample had an Ra of 0.5 nm, which was the same as that of the sample obtained in Example 3.

EXAMPLE 5

Using a sputtering apparatus of the stationary facing type, an NiP film, chromium film, Co-Cr-Pt magnetic film, and carbon nitride protective film were successively provided on the surface of the glass substrate for magnetic disks obtained in Example 1, by sputtering in an argon atmosphere using nickel phosphide, chromium metal, a cobalt-chromium-platinum alloy, and carbon nitride as targets, respectively. Thereafter, a perfluoropolyether lubricant was applied thereto. The magnetic recording medium thus obtained was examined for magnetic characteristics with a vibration sample magnetometer to determine the coercive force in a radial direction of the magnetic recording medium and that in a direction along a circumferential direction thereof. As a result, the ratio of the circumferential-direction coercive force of the magnetic recording medium produced to the radial-direction coercive force thereof was found to be 1.03. The recording medium was thus ascertained to have magnetic anisotropy in which the coercive force was higher in circumferential directions. This magnetic recording medium was examined for TOH (take-off height), which is a measure of head flying stability. As a result, the TOH was found to be 6.8 nm. The TOH measurement was made by the following method. The magnetic recording medium was rotated and the rotational speed thereof was gradually lowered to thereby reduce the head flying height. Simultaneously therewith, signals from a piezoelectric device attached to the head were detected, and the head flying height at the threshold where the output of signals from the piezoelectric device abruptly increased was determined. This height was taken as the TOH. Smaller values of TOH mean that the head flies stably at smaller flying heights.

EXAMPLE 6

A textured glass substrate produced by the same method as in Example 1 was chemically strengthened by immersing it for 90 minutes in a molten salt mixture heated at 380° C. consisting of potassium nitrate (60% by weight) and sodium nitrate (40% by weight). After the chemical strengthening treatment, the glass substrate was immersed in 65° C. hot water to remove the residue of the molten salts from the glass surface. The glass substrate was further immersed for 5 minutes in 3% sulfuric acid solution kept at 40° C. while applying 48 kHz ultrasonic thereto at 1 W/cm$^2$, and was then rinsed in a pure-water bath. Subsequently, the glass substrate was immersed in an aqueous potassium hydroxide solution having a pH of 9.5 and then rinsed and dried in the same manner as in Example 1 to obtain a sample. The main surface of the sample obtained had an Ra of 1.2 nm, showing that the same satisfactory texture as in Example 1 could be obtained even through chemical strengthening. The sample was further analyzed by total-reflection fluorescent X-ray spectroscopy to determine the iron element remaining on the surface. As a result, the amount of residual iron was found to be below the detection limit ($1 \times 10^8$ atoms/cm$^2$)

EXAMPLE 7

A glass substrate sample was produced in the same manner as in Example 6, except that the cleaning with sulfuric acid and that with potassium hydroxide were omitted. This glass substrate sample was analyzed to determine the iron element remaining on the main surface thereof. As a result, the amount of residual iron was found to be $5 \times 10^{10}$ atoms/cm$^2$, which was larger than in Example 6.

EXAMPLE 8

A glass substrate sample was produced in the same manner as in Example 1, except that the mirror polishing was conducted so that the polished glass substrate surface had an Ra of 0.15 nm by modifying the polishing conditions. The surface roughness Ra of the main surface of this sample was examined with an AFM, and was found to be 0.45 nm. The main surface had a radical-direction line density of 15,000 lines/mm. This substrate was used to produce a magnetic recording medium by the same method as in Example 5, and this recording medium was examined for TOH. As a result, the TOH thereof was found to be 5.2 nm, which was a satisfactory value.

EXAMPLE 9

A glass substrate sample was produced in the same manner as in Example 8, except that the concentration of the hydrofluoric acid solution was changed to 0.3%. The surface roughness Ra of the main surface of this sample was examined with an AEM, and was found to be 0.73 nm. The main surface had a line density of 2,000 lines/mm. This sample was used to produce a magnetic recording medium by the same method as in Example 5. The magnetic recording medium obtained had a coercive-force ratio of 1.01, which was slightly lower than in Example 5.

COMPARATIVE EXAMPLE 1

A glass substrate for magnetic recording media was produced in the same manner as in Example 1, except that the etching step was omitted. The glass substrate obtained had an Ra of 0.35 nm. In an examination with an AFM, no circumferentially oriented surface roughness was observed.

COMPARATIVE EXAMPLE 2

A glass plate which had been evenly mirror-polished so as to have an isotropic surface roughness with an Ra of about 0.3 nm was subjected to successive film formation by sputtering with a stationary facing type sputtering apparatus in the same manner as in Example 5. Thereafter, a perfluoropolyether lubricant was applied thereto. The ratio of the circumferential-direction coercive force of the magnetic recording medium obtained to the radial-direction coercive force thereof was 1.0. Namely, no magnetic anisotropy was observed in in-plane directions in the magnetic film.

According to the process of the invention for producing a glass substrate for magnetic recording media, processing marks having a compression strain are concentrically imparted to the main surface of a disk-form glass plate and this surface is then chemically etched. Thus, a surface roughness (texture) constituted of concentrically oriented, fine recesses and protrusions can be easily formed on the glass surface. This surface roughness makes the glass plate suitable for use as a glass substrate for magnetic recording media.

By conducting the chemical etching with an etchant containing hydrofluoric acid or hydrosilicofluoric acid or containing both, a large difference in the depth of chemical etching can be obtained between the areas having the processing marks and the areas not having the marks.

Furthermore, when the formation of processing marks is conducted by rubbing the main surface of the glass plate in a circumferential direction with a processing tape while supplying thereto a processing fluid comprising a slurry, then circumferentially oriented processing marks from which a surface roughness is formed can be imparted to the high-hardness glass plate surface at low cost.

In addition, by conducting a chemical strengthening treatment after the texturing treatment, a substrate having high rigidity can be obtained through simple steps. By cleaning the substrate with an acid and an alkali after the chemical strengthening, a glass substrate having a high degree of cleanliness can be obtained without changing the texture shape.

The disk-form glass substrate for magnetic recording media obtained by the invention has, in the main surface thereof, a circumferentially oriented surface roughness. Because of this, in the magnetic recording medium of the invention, the magnetic recording film provided on this glass substrate has such magnetic anisotropy that the coercive force in the circumferential directions is higher than that in the radial directions. Consequently, the magnetic recording medium is so reliable that the information magnetically recorded therein is not lost or attenuated even upon long-term use.

This application is based on Japanese patent applications JP 2000-383216, filed Dec. 18, 2000, and JP 2001-363504, filed Nov. 29, 2001, the entire contents of each of which are hereby incorporated by reference, the same as if set forth at length.

What is claimed is:

1. A process for producing a glass substrate for a magnetic recording medium by forming a surface roughness in a main surface of a glass plate that has been formed into a disk shape, which comprises:

imparting a processing mark having a permanent strain to the main surface of the glass plate in a circumferential direction thereof; and chemically etching the whole main surface of the glass plate, so as to form the surface roughness, wherein the processing mark is formed by rubbing the main surface of the glass plate with a processing tape in a circumferential direction of the glass plate, while supplying a processing fluid comprising a slurry to the main surface of the glass plate, and the surface roughness is formed based on a difference in etching rate between the portion having the processing mark and the portion not having the processing mark.

2. The process according to claim 1, wherein the chemical etching is conducted with an etchant containing at least one of hydrofluoric acid and hydrosilicofluoric acid.

3. The process according to claim 1, which further comprises subjecting the glass substrate which has undergone the roughness-forming treatment to a chemical strengthening treatment in which part of the ions contained in the glass substrate are replaced with ions contained in a molten salt which have a larger ionic radius than those ions.

4. The process according to claim 3, which further comprises subjecting the glass substrate which has undergone the chemical strengthening treatment to cleaning of the main surface of the glass substrate with an acid aqueous solution and with an alkaline aqueous solution successively.

5. A glass substrate for a magnetic recording medium produced by the process according to claim 1, wherein the roughness formed in the main surface of the glass substrate is linearly arranged in a circumferential direction, the main surface of the glass substrate has a surface roughness of 0.5 to 1.0 nm in terms of an Ra value as determined with an AFM, and the main surface of the glass substrate has an Rmax value, which is obtained by subtracting the minimum height of the roughness from the maximum height thereof, of 3.0 nm or higher.

6. The glass substrate according to claim 5, wherein the Rmax value is 15 nm or lower.

7. A glass substrate for a magnetic recording medium produced by the process according to claim 1, wherein the main surface of the glass substrate has a surface roughness of 0.2 to 0.5 nm in terms of Ra value as determined with an AFM, and has an Rmax value, which is obtained by subtracting the minimum height of the roughness from the maximum height thereof, of 2.0 nm or higher.

8. The glass substrate according to claim 5, wherein the main surface of the glass substrate has a radial-direction line density of 5,000 to 40,000 lines per mm as determined with an AFM.

9. A magnetic recording medium which comprises: the glass substrate according to claim 5; and a magnetic recording film including a magnetic film, so that the magnetic recording film covers the main surface of the glass substrate.

* * * * *